US008448132B2

(12) United States Patent
Lochmann

(10) Patent No.: US 8,448,132 B2
(45) Date of Patent: May 21, 2013

(54) SYSTEMS AND METHODS FOR MODIFYING CODE GENERATION TEMPLATES

(75) Inventor: Henrik Lochmann, Dresden (DE)

(73) Assignee: SAP AG, Walldorf (DE)

( * ) Notice: Subject to any disclaimer, the term of this patent is extended or adjusted under 35 U.S.C. 154(b) by 1049 days.

(21) Appl. No.: 12/437,252

(22) Filed: May 7, 2009

(65) Prior Publication Data

US 2010/0287528 A1 Nov. 11, 2010

(51) Int. Cl.
*G06F 9/44* (2006.01)
*G06F 8/20* (2006.01)
*G06F 9/54* (2006.01)

(52) U.S. Cl.
USPC .............. 717/104; 707/999.102; 719/313

(58) Field of Classification Search
None
See application file for complete search history.

(56) References Cited

U.S. PATENT DOCUMENTS

| | | | |
|---|---|---|---|
| 6,199,195 B1 | 3/2001 | Goodwin et al. | |
| 6,226,792 B1 | 5/2001 | Goiffon et al. | |
| 6,230,160 B1 | 5/2001 | Chan et al. | |
| 6,684,388 B1 | 1/2004 | Gupta et al. | |
| 6,742,175 B1 | 5/2004 | Brassard | |
| 6,876,314 B1 | 4/2005 | Lin | |
| 6,877,155 B1 | 4/2005 | Lindsey | |
| 7,047,518 B2 | 5/2006 | Little et al. | |
| 7,152,228 B2 | 12/2006 | Goodwin et al. | |
| 7,237,225 B2 | 6/2007 | Kompalli et al. | |
| 7,533,365 B1 | 5/2009 | Hogstrom et al. | |
| 7,546,602 B2 * | 6/2009 | Hejlsberg et al. | 719/313 |
| 7,676,786 B2 | 3/2010 | Shenfield et al. | |
| 7,689,969 B1 | 3/2010 | Wendling | |
| 7,703,073 B2 * | 4/2010 | Illowsky et al. | 717/121 |
| 7,761,848 B1 | 7/2010 | Chaffin | |
| 7,890,928 B2 * | 2/2011 | Patrudu | 717/114 |
| 7,941,438 B2 | 5/2011 | Molina-Moreno et al. | |
| 8,001,519 B2 | 8/2011 | Conallen et al. | |
| 8,015,546 B2 | 9/2011 | Jones et al. | |
| 8,104,017 B2 | 1/2012 | Lin et al. | |
| 2002/0178434 A1 | 11/2002 | Fox et al. | |
| 2003/0083900 A1 | 5/2003 | Khriss et al. | |
| 2003/0163603 A1 | 8/2003 | Fry et al. | |
| 2004/0111702 A1 | 6/2004 | Chan | |

(Continued)

FOREIGN PATENT DOCUMENTS

| | | |
|---|---|---|
| EP | 2098954 A1 | 9/2009 |
| WO | 2008027590 A1 | 3/2008 |
| WO | 2008027590 A2 | 3/2008 |

OTHER PUBLICATIONS

Efftinge S. et al., "openArchitectureWare User Guide," Ver. 4.2, Sep. 15, 2007.

(Continued)

*Primary Examiner* — Don Wong
*Assistant Examiner* — Mohammad Kabir
(74) *Attorney, Agent, or Firm* — Fountainhead Law Group PC

(57) ABSTRACT

Embodiments of the present invention include systems and methods for template reverse engineering. In one embodiment, the present invention includes a computer-implemented method for code generation comprising receiving a template for generating code, receiving a model for generating code, processing the template and the model in a code generator, and in accordance therewith, generating code based on the model and the template, and automatically identifying a common program code construct in two or more of the generated code files. The common code may be automatically extracted from the generated code and embedded in a framework, and the templates may be modified to reference the framework.

20 Claims, 8 Drawing Sheets

U.S. PATENT DOCUMENTS

| | | | |
|---|---|---|---|
| 2004/0216087 A1 | 10/2004 | Wilson et al. | |
| 2005/0132326 A1 | 6/2005 | Chischportich et al. | |
| 2005/0144226 A1 | 6/2005 | Purewal | |
| 2005/0204334 A1 | 9/2005 | Parthasarathy et al. | |
| 2006/0015856 A1 | 1/2006 | Lotter | |
| 2006/0200799 A1* | 9/2006 | Wills et al. | 717/109 |
| 2007/0226244 A1* | 9/2007 | Chandrasekharan et al. | 707/102 |
| 2007/0260571 A1 | 11/2007 | Mansfield et al. | |
| 2008/0046868 A1 | 2/2008 | Tsantilis | |
| 2008/0082959 A1* | 4/2008 | Fowler | 717/104 |
| 2008/0127057 A1 | 5/2008 | Costa et al. | |
| 2008/0127061 A1 | 5/2008 | Kasman et al. | |
| 2009/0064096 A1 | 3/2009 | Goebel | |

OTHER PUBLICATIONS

European Search Report (from a corresponding foreign application), EP09003299, mailed Jun. 25, 2009.
Hugo Troche, "Refacctoring with Eclipse. Eclipse provides a collection of refactoring features," Internet citation, Oct. 1, 2004.
Holger Krahn and Bernhard Rumpe, "Techniques for Lightweight Generator Refactoring," Generative and Transformational Techniques in Software Engineering Lecture Notes in Computer Science; LNCS, Springer, Berlin, DE, vol. 4143, Jan. 1, 2006.
Martin Fowler; Kent Beck; John Brant; William Opdyke; Don Roberts, "Chapter 11: Dealing with Generalization," Feb. 1, 2001; Refactoring: Improving the Design of Existing code, Addison-Wesley Professional, US pp. 202-208.
Extended European Search Report (from a corresponding foreign application) EP 10004455.1, mailed Jul. 10, 2010.
Jon Oldevik, Tor Neple "Traceability in Model to Text Transformations," SINTEF Information and Communication Technology.
CAFE Methods, Catalogue of Methods and Processes for Product Family Engineering from the CAFE Project, Detailed Descriptions.
MODA-TEL (Deliverable 3.5), MODA-TEL Methodology and Guidelines (Editor. Mariano Belaunde, France Telecom R&D), Aug. 2004.
SINTEF, ECMDA Traceability Workshop (ECMDA-TW), 2005 Proceedings (Nov. 8, 2005).
GHICA VAN EMDE BOAS, "Template Programming for Model-Driven Code Generation,", Oct. 7, 2004.
MOFScript—Project plan for a Eclipse GMT subproject, Dec. 21, 2005.
Jon Oldevik, MOFScript User Guide (Ver. 0.6), Nov. 2, 2006.
Object Management Group, Meta Object Facility (MOF) Core Specification, Ver. 2.0, Jan. 2006.
Meta Object Facility (MOF) 2.0 QueryNiew/Transformation Specification, Jul. 7, 2007.
Sven Efftinge, Peter Friese, Arno Haase, Clemens Kadura, Bernd Kolb, Dieter Moroff, Karsten Thoms, Markus Voelter, openArchitectureWare User Guide, Ver. 4.2, Sep. 15, 2007.
Sven Efftinge, Clemens Kadura, openArchitectureWare 4.1 Xpand Language Reference.
EMF, Eclipse Modeling Framework Project (EMF), 2008.
SINTEF, MOF Model to Text Transformation—MOFScript, Jun. 2006.
OMG's MetaObject Facility, Jan. 2008.
IBM, Model with the Eclipse Modeling Framework, Part 1: Create UML models and generate code., Apr. 15, 2004.

* cited by examiner

```
«REM»generates a java class from BusinessArtefact«ENDREM»
«DEFINE javaClass(String bundleId) FOR BusinessArtefact»
«FILE getFileForPackage(bundleId, this.name)-»
package «bundleId»;

public class «this.name» extends AbstractBusinessObject {
    «EXPAND javaProperty FOREACH this.attributes»
    «EXPAND javaProperty FOREACH this.references»
}
«ENDFILE»
«ENDDEFINE»
```

*Fig. 7*

SYSTEMS AND METHODS FOR MODIFYING CODE GENERATION TEMPLATES

BACKGROUND

The present invention relates to code generation, and in particular, systems and methods for automatically modifying code generation templates in a code generation software system.

Historically, computer software programs for controlling the operation of computers were created and developed by computer programmers writing the code that defined the operations to be performed. For example, typically, computer programmers would write code in such languages as FORTRAN, PASCAL, C, C++, Java, and many other languages. The code would then be compiled to generate machine language instructions (i.e., zeros and ones) for execution on the computer system's hardware. However, developing code by hand is a very time consuming and labor intensive process, in some cases requiring hundreds or even thousands of programmer hours to implement a complex software system.

Recently, the concept of code generation has attracted increasing attention. For example, rather than writing computer programming code line by line, code generation paradigms posit that a software developer specify the desired operational behavior of the software, and a functional specification may be used to automatically generate code in any desired language or for any desired platform. However, the promise of automatic code generation has not been completely fulfilled because of inherent difficulties in implementing such systems.

The paradigm of Model-Driven Software Development motivates the lifting of fine-grained code structures and development to coarser-grained models and higher levels of designing. This abstraction process approximates the developer's mental model of the underlying implementation and, hence, reduces the necessary effort in production of such software. Based on readily developed system architecture models, appropriate code generators produce executable runtime code.

For example, one approach to automatic code generation is referred to as Model-Driven Software Development ("MDSD" or "MDD"). FIG. 1 illustrates a typical MDSD architecture. The example MDSD software includes a model 101, template 102, and code generator 103 that generates code 104. A model 101 describes the structure and behavior of a software system. This description may be a high level description of states, entities, transitions, and a variety of other factors for describing the software. For example, a model may include a declarative description of data structures to be generated or a description of a user interface. The model may be an instance of a meta model for describing a system at a higher level of abstraction (i.e., more generally). The model may be specified using a modeling language, for example. A modeling language is any artificial language that can be used to express information or knowledge or systems in a structure that is defined by a consistent set of rules. The rules are used for interpretation of the meaning of elements in the structure. Modeling languages can be used to specify system requirements, structures, and behaviors. Modeling languages are intended to be used to precisely specify systems so that stakeholders (e.g., customers, operators, analysts, designers) can better understand the system being modeled. Example modeling technologies are Eclipse Modeling Framework ("EMF"), whose language to create metamodels is called "Ecore" (the metametamodel), and the MetaObject Facility ("MOF") from the Object Management Group with the metametamodel also called "MOF" or a smaller version "EMOF" (essential MOF).

Templates 102 are used to generate code based on a model in the context of a meta-model. Templates control output code generation. For example, a template may be used to access the model, execute logic, and perform various other tasks. A template may retrieve data structures defined in a model to generate code. The template may be a text file that is interpreted by the code generator 103 (e.g., at runtime of the code generator) to generate code 104. Templates may include one or more import statements, one or more extension statements, and one or more define blocks (i.e., definitions) and may be written in template languages such as XPAND and MOFScript, for example.

Developing templates for code generators is a time-consuming and error-prone process. Even if developers are able to create appropriate templates, template maintenance remains challenging. Potentially very complex generator templates may need to be adapted if new requirements arise. In this case, it is essential that no new errors are introduced and already developed assets must remain operational as they were before modification.

Thus, it would be desirable to simplify template modification in a code generation system. The present invention solves these and other problems by providing systems and methods for automatically modifying code generation templates in a code generation software system.

SUMMARY

Embodiments of the present invention include systems and methods for generating code. In one embodiment, the present invention includes a computer-implemented method of generating computer program code comprising receiving one or more templates for generating code, receiving at least one model for generating code, processing the one or more templates and the model in a code generator executable on a computer system to generate a plurality of code files containing program code based on the model and the one or more templates, automatically identifying a common program code construct in two or more of the generated code files, and automatically modifying each template used to generate the common program code construct to include a reference to a code framework, said code framework including said common program code construct.

In one embodiment the method further comprises, after said step of identifying, automatically moving the identified common program code construct to the code framework.

In one embodiment, said common code construct is included in a plurality of different program classes in the generated code files, the method further comprising creating a parent class, storing the common program code construct in the parent class, and creating an inheritance between the parent class and said plurality of different program classes in the generated code files.

In one embodiment, said reference to the code framework is a reference to said parent class.

In one embodiment, the code framework is accessible by the generated code files.

In one embodiment, the common program code construct in said two or more generated code files are each generated based on the same portion of the same template.

In one embodiment, the method further comprises generating modified code based on said model and said modified templates, said modified code including said references to said code framework.

In one embodiment, upon execution of said generated modified code, said generated modified code uses said references to said code framework to access said common program code constructs.

In one embodiment, the code framework is static.

In one embodiment, the present invention includes a computer-implemented system comprising a code generator, executable on a computer, for receiving at least one software model and one or more templates for generating code, wherein the software model specifies the software operations and comprises a plurality of elements to be translated into code constructs, and wherein the template specifies code constructs to be used from the plurality of elements in said software model, the code generator processing the one or more templates and the software model, and in accordance therewith, generating a plurality of code files containing program code based on the software model and the one or more templates, a framework generator, executable on said computer, for automatically identifying a common program code construct in two or more of the generated code files and moving said common program code construct in a code framework, and a code-to-template change processor, executable on said computer, for automatically modifying each template used to generate the common program code construct to include a reference to a code framework.

In one embodiment, the present invention includes a computer-readable medium containing instructions for controlling a computer system to perform a method as set forth herein.

The following detailed description and accompanying drawings provide a better understanding of the nature and advantages of the present invention.

BRIEF DESCRIPTION OF THE DRAWINGS

FIG. 7 illustrates an example of a modified template including a reference according to one embodiment of the present invention.

DETAILED DESCRIPTION

Described herein are techniques for generating code based on templates and automatically modifying the templates. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
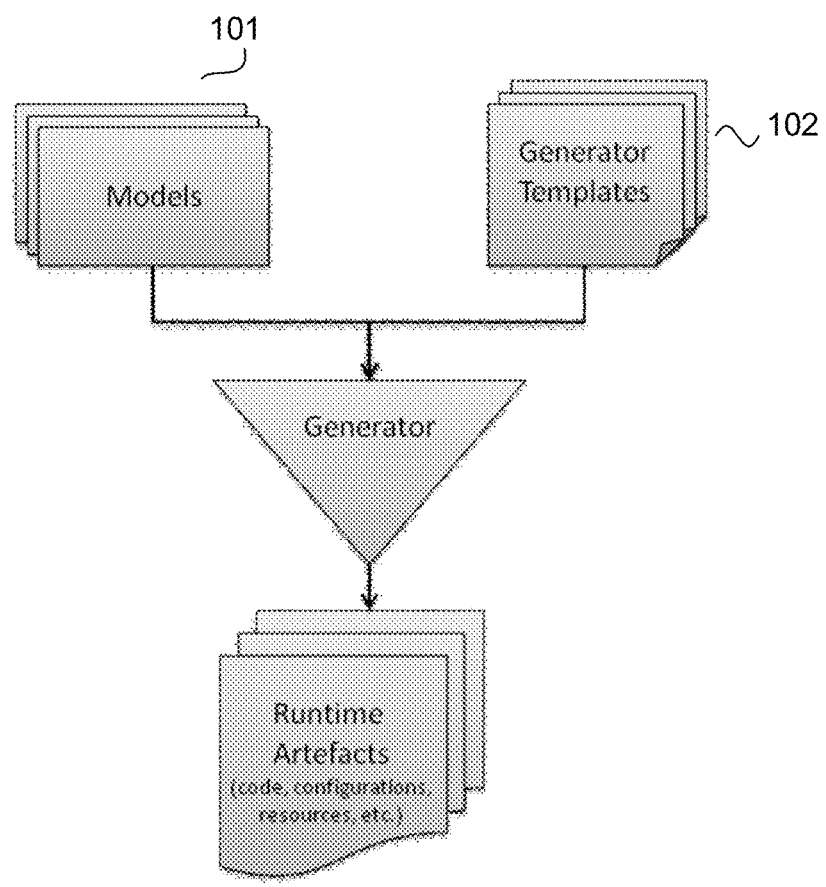
FIG. 1 illustrates a typical model driven software development architecture.
Figure 2:
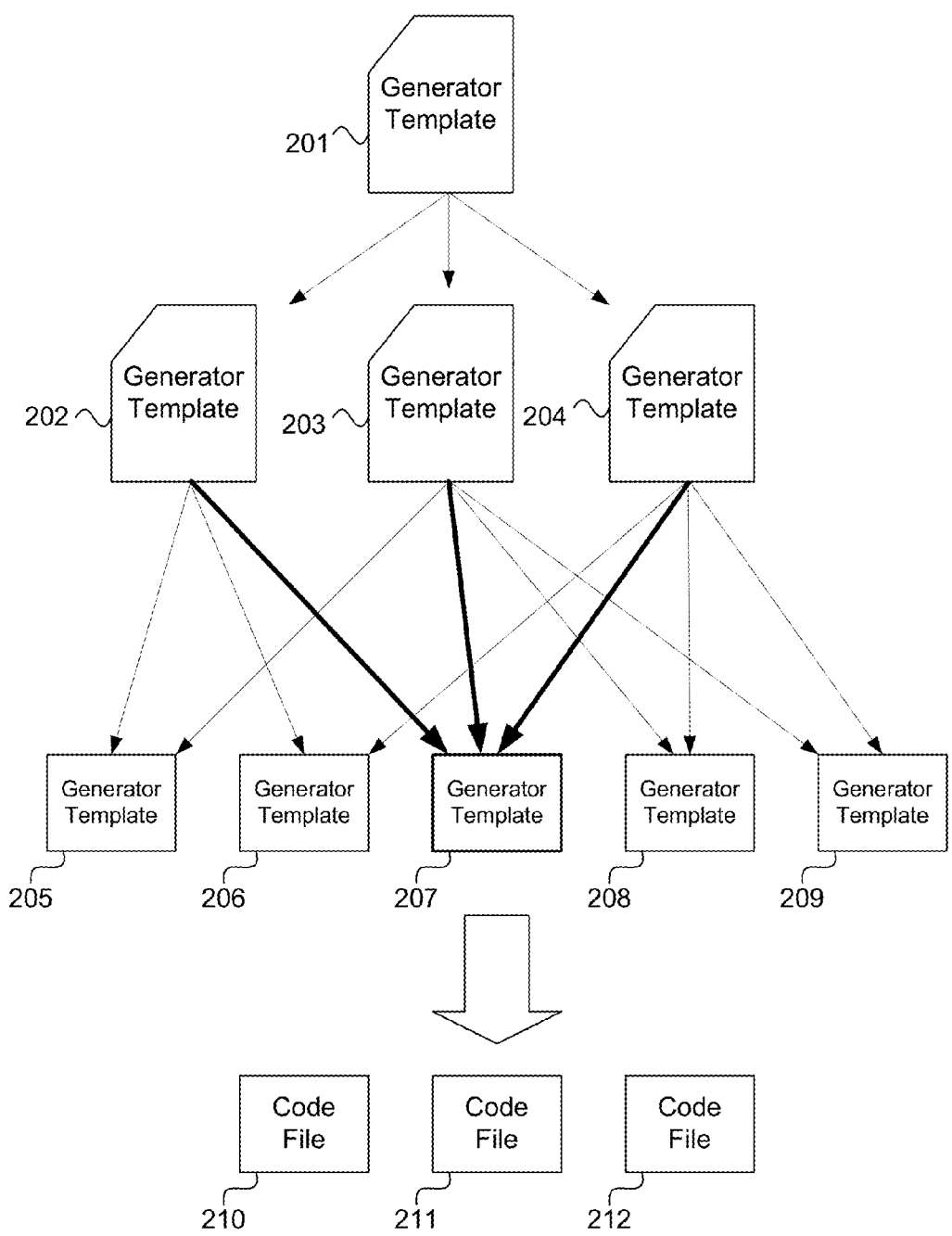
FIG. 2 illustrates templates used to generate code.

FIG. 2 illustrates templates used to generate code. As illustrated in FIG. 2, templates in a code generator are decoupled into different modules. Each module or template may address a dedicated concern or function in code generation. When generating object-oriented code, for example, there may be a template that produces the declaration of a class and another template that produces getter and setter methods for the fields of that class. The different templates are connected to each other through invocation. For instance, a parent template invokes all child templates. In case a new requirement is to be implemented, multiple generator templates may have to be taken into account. In FIG. 2, template 201 may invoke templates 202-204. Similarly, templates 202-204 may invoke one or more of templates 205-209. As shown in FIG. 2, resulting modifications to one of the templates (e.g., template 207) may affect all parent templates (e.g., templates 202-204) because it is invoked by its ancestors.

Features and advantages of the present invention include generating variable code components and storing foundational code components in a framework to reduce the adaptation of templates. Generating foundational components of a runtime system, which may never change even for the most diverse input models, leads to tremendous challenges for the template developer who maintains and adjusts generator templates. In one embodiment of the present invention, code may be automatically analyzed by software and, if a code generator produces multiple files, the actual differences between these files may be automatically checked by the software. Equivalent code constructs (common program code) in different source code files may be analyzed for potential relocation into a common framework for generated code assets. This process may be referred to herein as refactoring of generated code.

Figure 3:
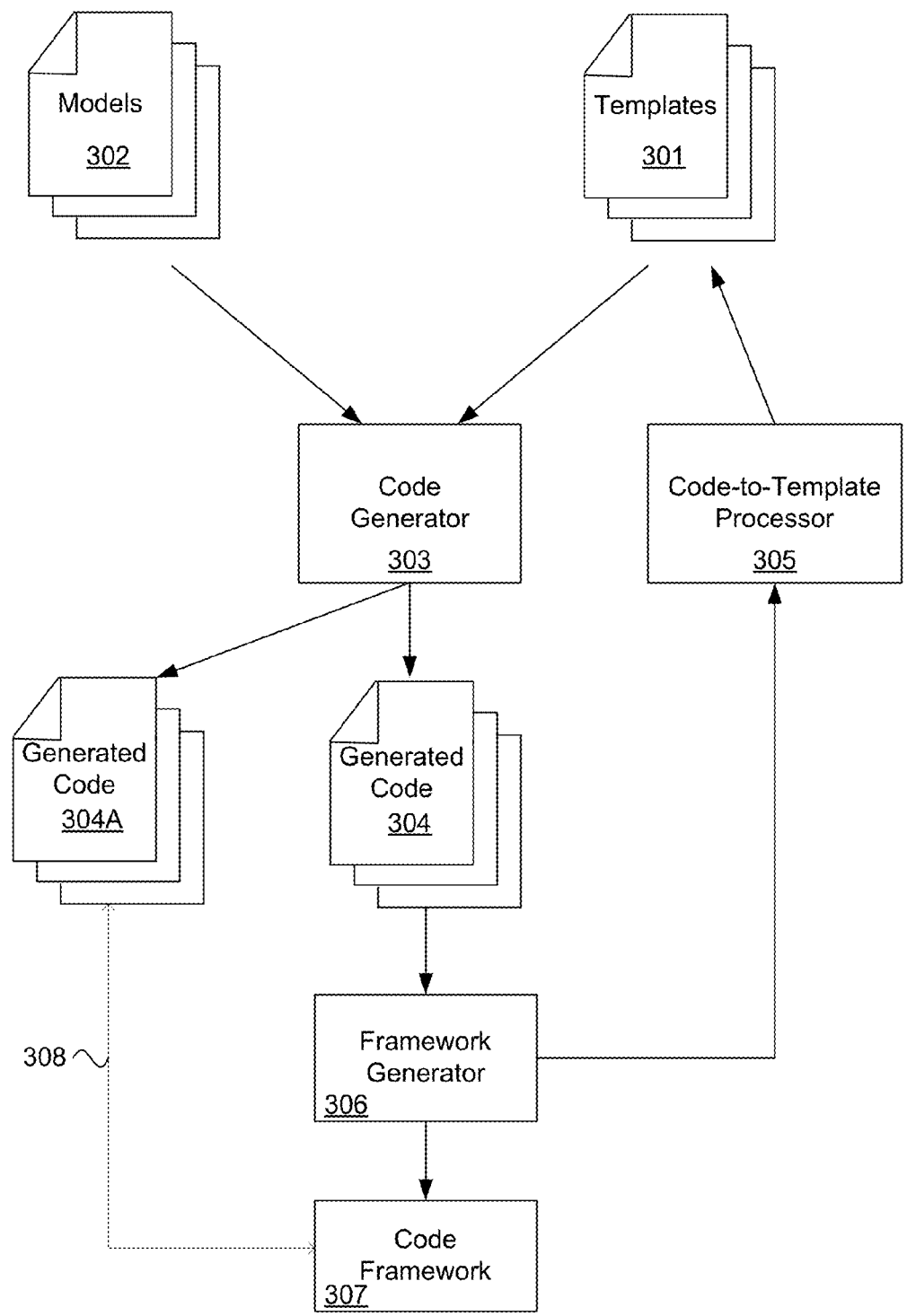
FIG. 3 is an example of modifying code generation templates according to one embodiment of the present invention.

FIG. 3 illustrates code generation according to an embodiment of the present invention. The present example is described in the context of Model-Driven Software Development ("MDSD" or "MDD"), but other embodiments of the present invention may be used in other template-based code generation technologies. FIG. 3 illustrates model-driven architecture where one or more templates 301 and one or more models 302 are used to generate code. As mentioned above, model 302 describes the structure and behavior of a software system and may include model elements that describe states, entities, transitions, for example, of the desired software for which code is to be generated. The model may be an instance of a meta model for describing a system at a higher level of abstraction (i.e., more generally) and may be specified using a modeling language such as EMF or MOF, for example.

Templates 301 are used to generate code based on one or more models in the context of a meta-model. Templates control output code generation and, as mentioned above, may be used to access the model, execute logic, and perform various other tasks. The templates may be text files that are interpreted by the code generator 303 to generate code 304. The code 304 may be generated in a single file or in a plurality of separate files or modules, for example. Embodiments of the present invention include automatically identifying one or more common program code constructs in two or more generated code files. Common code constructs may correspond to features specified in multiple different templates, for example, and may pertain to foundational components of the overall software system to be generated. In one embodiment, a framework generator 306 may automatically identify one or more common program code constructs in two or more of the generated code files and move the common program code construct in a code framework 307. Code framework 307 may include code that is used by multiple different generated code files to provide foundational support for the software system, for example. The identified common code constructs may be reflected back into the templates using code-to-template processor 305. Code-to-template change processor 305 may automatically modify each template used to generate the common program code constructs to include references to a code framework, rather than the common code constructs themselves, for example. Accordingly, the changes to the generated source code are automatically propagated back into the templates used to generate the code. Therefore, the next time the templates 301 and model 302 are processed by the code generator 303, the generated code 304A automatically includes a reference 308 to the framework 307 for accessing the common code constructs. As a result, the code generated subsequently by the code generator based on the model(s) and modified template(s) automatically generates code 304A that operates together with code in the framework 307 to implement the software system defined by templates 301 and model(s) 302. However, changes to any code in the framework 307 (e.g., any changes to foundational coding issues) only require changes to the framework code and changes to the templates are reduced or eliminated.

Figure 4:
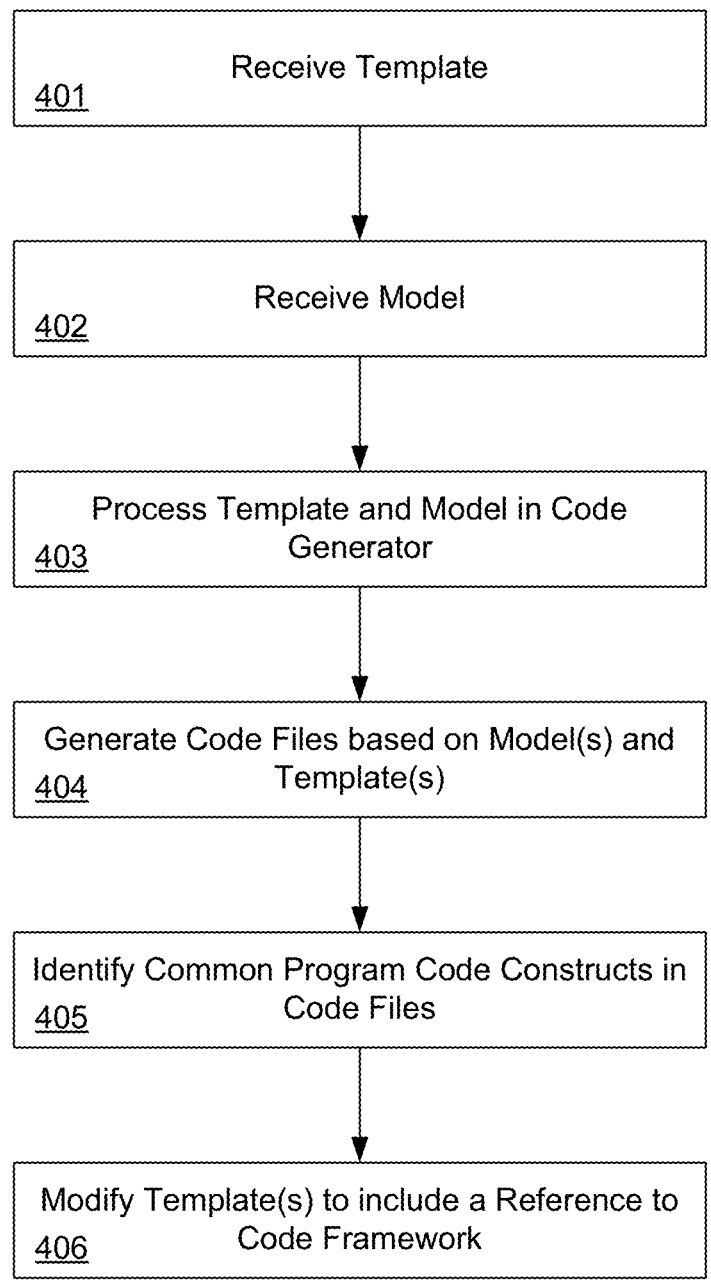
FIG. 4 illustrates a method according to one embodiment of the present invention.

FIG. 4 illustrates a method according to one embodiment of the present invention. At 401, the system receives one or more templates for use in generating code. At 402, the system receives one or more models for use in generating code. At 403, the template(s) and model(s) are processed in a code generator executable on a computer system. At 404, source code files containing program code are generated by the code generator based on the specifications in the model(s) and template(s). At 405, common program code in two or more generated code files is automatically identified. At 406, each template used to generate a common program code construct is modified to include a reference to a code framework.

Figure 5:
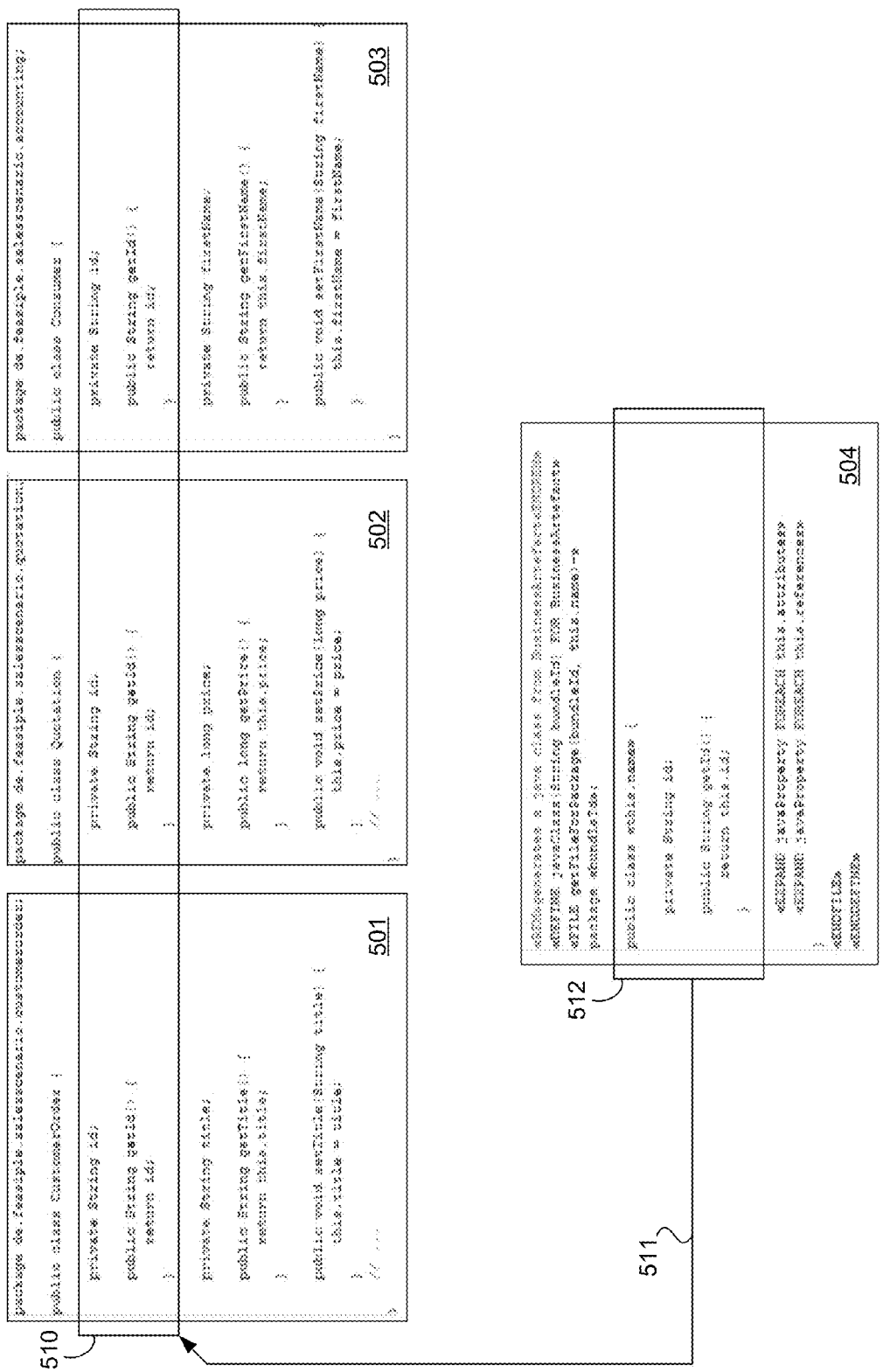
FIG. 5 illustrates an example of identifying common code according to one embodiment of the present invention.

FIG. 5 illustrates an example of identifying common code according to one embodiment of the present invention. As mentioned above, embodiments of the present invention may specify the extraction of source code constructs that are equal for all generated code artifacts (common program code). The identified common program code may then be included as part of a framework, which can be made accessible to generated program code as needed. FIG. 5 illustrates an example of three different generated code files 501, 502, and 503 having three different java classes (e.g., CustomerOrder, Quotation, and Consumer). The classes in this case may have been generated from corresponding templates, for example. The equal code parts in each generated code asset are illustrated at 510. In this example, all classes have an "id" attribute and a corresponding getter method, which is produced by template 504 code part 512 as illustrated at 511. Accordingly, before refactoring, the template contains hard coded parts that generated common code. These hard coded template parts are moved to the framework. In this example, the common code construct is identified in the generated code and moved to a parent class (or super class). This approach may be advantageous in a case where the attribute is a platform-specific detail (e.g., for object-relational database mappings). As described below, the hard-coded part from the template may be omitted, and generated classes may inherit from a parent class (or superclass) that already defines the id attribute. Accordingly, such a parent class may be moved to the framework. For example, if the code generator generates common code, such common code may be automatically moved to the framework (e.g., into which the code generator generates) and different generated code files may access the framework so that different classes may inherit from the generated parent class.

Figure 6:
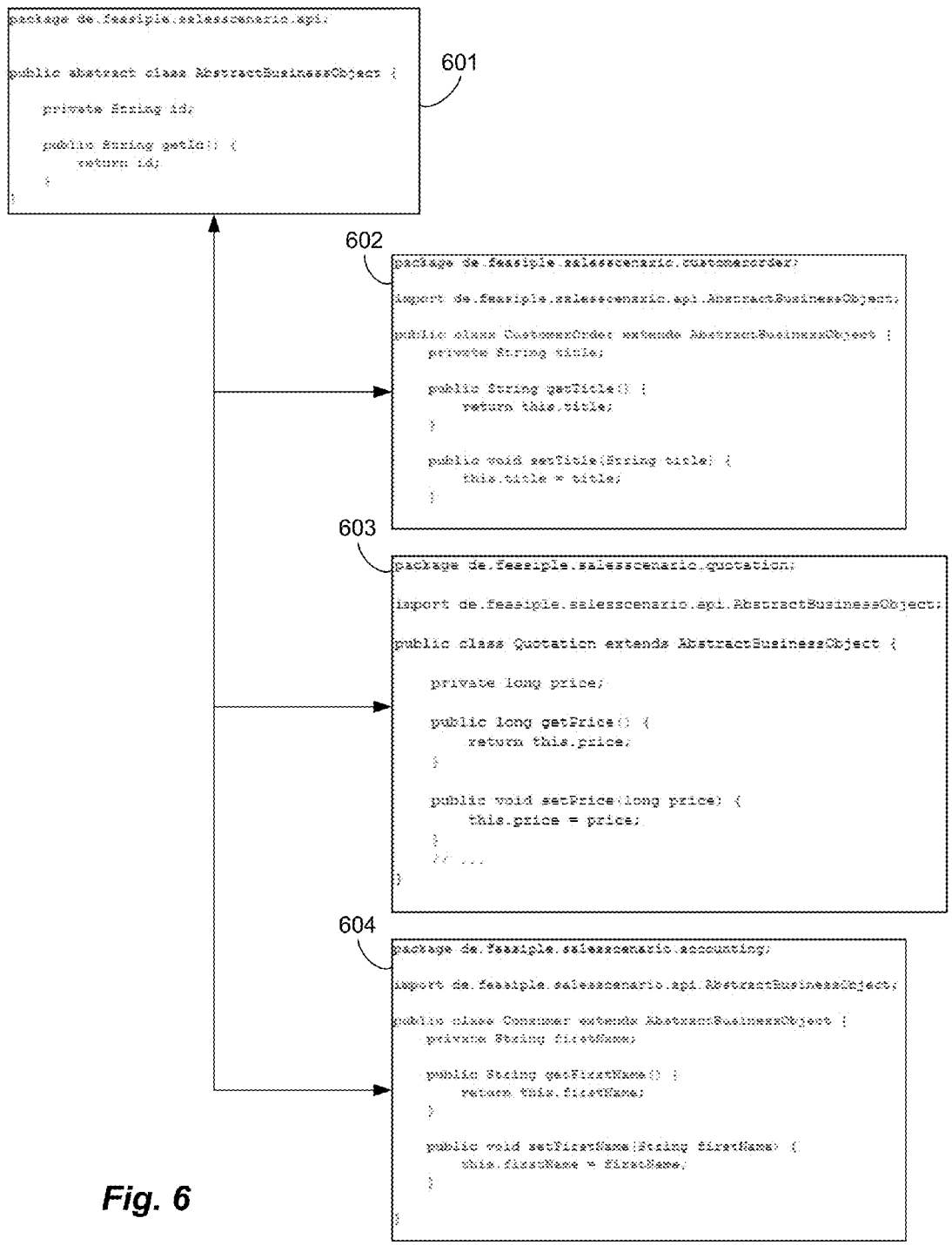
FIG. 6 illustrates an example of generated code according to one embodiment of the present invention.

FIG. 6 illustrates an example of generated code according to one embodiment of the present invention. FIG. 6 illustrates the creation of a new abstract parent class 601 "AbstractBusinessObject," which contains the "id" attribute and an associated getter method. The generated classes are CustomerOrder 602, Quotation 603, and Consumer 604, each of which now inherits from the abstract parent class 601 to implement the "id" attribute, for example. The new abstract parent class 601 (e.g., "AbstractBusinessObject") may be moved to a framework and each of the generated classes may include a reference (e.g., "extends AbstractBusinessObject") to the parent class. Accordingly, functionality that was previously in multiple different code files, and multiple different templates, may be moved to the framework so that changes to common code may be advantageously simplified.

Accordingly, refactoring of the code may be reflected back into the template used to generate the code so that the references to the framework are included in the generated code automatically. Thus, the templates may be modified to produce appropriate inheritance code. This is illustrated in code modules 602, 603, and 604, which when generated using modified templates each include "extends" statement referencing the parent class "AbstractBusinessObject." Additionally, the template part that produced the "id" attribute can now be omitted in the template and embedded in the framework as described above. The framework may be static, in the sense that new templates and models may be developed and modified that leverage off of the resources in the framework. If the software system resulting from the generated code requires modification or updating, a developer may only need to change the templates, while core code components in the framework remain unchanged.

FIG. 7 illustrates an example of a reference in a template to a parent class including common code according to one embodiment of the present invention. As illustrated in FIG. 7, the template is modified to include a reference to the newly created parent class (e.g., "AbstractBusinessObject") so that the template can be used to generate code having classes that may inherit from the parent class in the framework.

Identifying common code parts in generated program code assets may be performed by tracing back from the code to the particular generator templates that produced the program code assets. A template may be written for a certain part in a metamodel, such as a model element class/type. Therefore, instances of this type (which are contained in the models) visit the template, and the code is generated. Common code typically refers to code that is generated based on the same portion of one or more templates. Accordingly, particular code files, and the particular lines of code in each code file, may be linked together and used for refactoring operations. For example, since many templates may generate into the content of one single file, common code may originate from different templates. Additionally, the example template in FIG. 5 illustrates a case where the common code stems from only one template. In either case, FIG. 2 illustrates advantages of refactoring as described herein. For instance, template calls may cascade, as illustrated in FIG. 2. Specifically, there are at least two different ways that template modifications can have an effect on the template landscape. First, a template may use a call signature, hence, it may be invoked in the same manner as a method. If a leaf template is changed such that additional parameters are necessary, another parameter must be introduced into the call signature. This has an effect on all invoking templates which then need to pass the additional parameter (i.e., regardless of whether common code comes from only one or more templates). Second, a leaf template that generates code into the content of a file, generates this code succeeding to previously invoked parent or sibling templates. Hence, the generated content embeds into already generated other code. Thus, the leaf template must adhere to a certain context of generated code for the content it produces. If the leaf template must change, it might break this context with the newly generated code portion and the entire generated asset becomes invalid. This entails that parent templates must change their parts in order to adapt the leaf templates context. This may occur where common code comes from more than one template.

Tracing techniques for generating code and modifying a template based on changes to generated code are described in commonly owned U.S. patent application Ser. No. 12/044,787, entitled "Systems and Methods for Template Reverse Engineering", filed on Mar. 7, 2008, naming Henrick Lochmann as inventor, the entire disclosure of which is hereby incorporated herein by reference. The actual refactoring operation, such as parent class (or super class) extraction shown in the example above, may be performed by existing tools and IDEs, such as the Eclipse IDE. The adaptation of generator templates vary based on the specific implementation.

Figure 8:
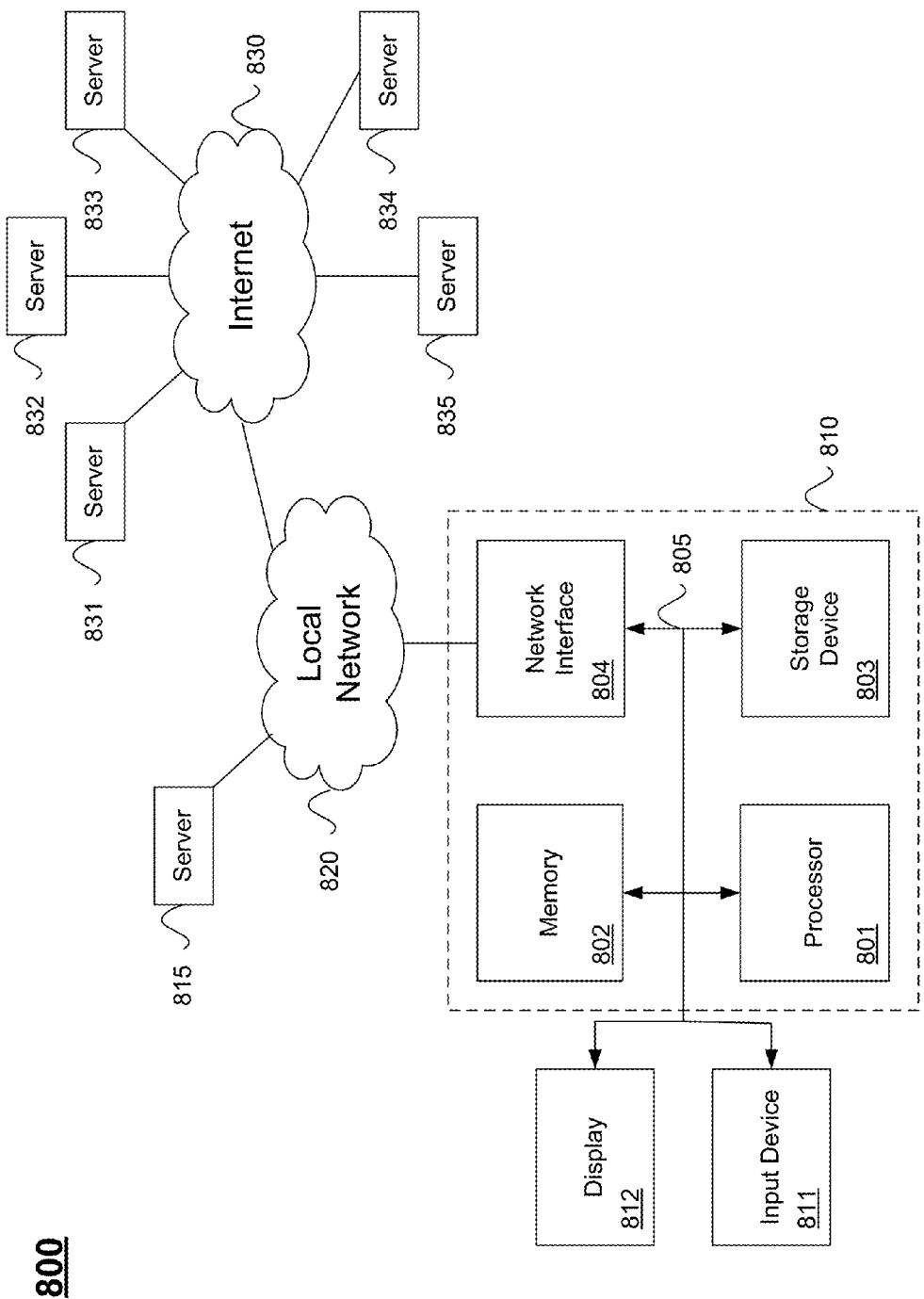
FIG. 8 illustrates system including template reverse engineering according to one embodiment of the present invention.

FIG. 8 illustrates system including template reverse engineering computer system and networks according to one embodiment of the present invention. Computer system 810 includes a bus 805 or other communication mechanism for communicating information, and a processor 801 coupled with bus 805 for processing information. Computer system 810 also includes a memory 802 coupled to bus 805 for storing information and instructions to be executed by processor 801, including instructions for performing the techniques described above. This memory may also be used for storing temporary variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage devices 803 and memory 802 are examples of computer readable mediums for storing software comprising instructions for implementing the techniques described above.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links is also another example. In any such implementation, network interface 804 sends and receives electrical, electromagnetic, or optical signals that carry digital data streams representing various types of information.

Computer system 810 can send and receive information, including models, templates, and other constructs described above, through the network interface 804 to an Intranet or the Internet 830. In the Internet example, electronic materials described above may reside on multiple different computer systems 810 or servers 831 across the network. For example, templates or models described above may be created on a local computer system and deployed on one or more servers, for example. A server 831 may transmit such items through Internet 830, local network 820, and network interface 804 to a component on computer system 810. Code generators, mapping components, and change processors described above may be implemented on the same system or on different machines than the inputs and outputs they receive and output. The templates, code, or other inputs may then be sent to the processor 801 via bus 805 for processing. The received information may then be processed by processor 801 and/or stored in storage device 803, or other non-volatile storage for later execution. This process of sending and receiving information may be applied to communication between computer system 810 and any of the servers 831 to 835 in either direction. It may also be applied to communication between any two servers 831 to 835.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of generating computer program code comprising:
receiving one or more templates for generating code;
receiving at least one model for generating code;
processing the one or more templates and the model in a code generator executable on a computer system to generate a plurality of code files containing program code based on the model and the one or more templates;
automatically identifying a common program code construct in two or more of the generated code files; and
automatically modifying each template used to generate the common program code construct to include a reference to a code framework, said code framework including said common program code construct.

2. The computer-implemented method of claim 1 further comprising, after said step of identifying, automatically moving the identified common program code construct to the code framework.

3. The computer-implemented method of claim 1 wherein said common code construct is included in a plurality of different program classes in the generated code files, the method further comprising:
creating a parent class;
storing the common program code construct in the parent class; and
creating an inheritance between the parent class and said plurality of different program classes in the generated code files.

4. The computer-implemented method of claim 3 wherein said reference to the code framework is a reference to said parent class.

5. The computer-implemented method of claim 1 wherein the code framework is accessible by the generated code files.

6. The computer-implemented method of claim 1 wherein the common program code construct in said two or more generated code files are each generated based on the same portion of one or more templates.

7. The computer-implemented method of claim 1 further comprising generating modified code based on said model and said modified templates, said modified code including said references to said code framework.

8. The computer-implemented method of claim 7 wherein, upon execution of said generated modified code, said generated modified code uses said references to said code framework to access said common program code constructs.

9. A computer-implemented system comprising:
   a code generator, executable on a computer, for receiving at least one software model and one or more templates for generating code, wherein the software model specifies the software operations and comprises a plurality of elements to be translated into code constructs, and wherein the template specifies code constructs to be used from the plurality of elements in said software model, the code generator processing the one or more templates and the software model, and in accordance therewith, generating a plurality of code files containing program code based on the software model and the one or more templates;
   a framework generator, executable on said computer, for automatically identifying a common program code construct in two or more of the generated code files and moving said common program code construct in a code framework; and
   a code-to-template change processor, executable on said computer, for automatically modifying each template used to generate the common program code construct to include a reference to a code framework.

10. The computer-implemented system of claim 9 wherein said common code construct is included in a plurality of different program classes in the generated code files, and wherein the framework generator creates a parent class and creates an inheritance between the parent class and said plurality of different program classes in the generated code files.

11. The computer-implemented system of claim 10 wherein said reference to the code framework is a reference to said parent class.

12. The computer-implemented system of claim 9 wherein the code framework is accessible by the generated code files.

13. The computer-implemented system of claim 9 wherein the code framework is static.

14. A non-transitory computer-readable medium containing instructions for controlling a computer system to perform a method, the method comprising:
   receiving one or more templates for generating code;
   receiving at least one model for generating code;
   processing the one or more templates and the model in a code generator executable on a computer system to generate a plurality of code files containing program code based on the model and the one or more templates;
   automatically identifying a common program code construct in two or more of the generated code files; and
   automatically modifying each template used to generate the common program code construct to include a reference to a code framework, said code framework including said common program code construct.

15. The non-transitory computer-readable medium of claim 14, the method further comprising, after said step of identifying, automatically moving the identified common program code construct to the code framework.

16. The non-transitory computer-readable medium of claim 14 wherein said common code construct is included in a plurality of different program classes in the generated code files, the method further comprising:
   creating a parent class;
   storing the common program code construct in the parent class; and
   creating an inheritance between the parent class and said plurality of program classes in the generated code files.

17. The non-transitory computer-readable medium of claim 16 wherein said reference to the code framework is a reference to said parent class.

18. The non-transitory computer-readable medium of claim 14 wherein the code framework is accessible by the generated code files.

19. The non-transitory computer-readable medium of claim 14 wherein the code framework is static.

20. The non-transitory computer-readable medium of claim 14, the method further comprising generating modified code based on said model and said modified templates, said modified code including said references to said code framework, wherein, upon execution of said generated modified code, said generated modified code uses said references to said code framework to access said common program code construct.

* * * * *